(12) United States Patent
Bennett

(10) Patent No.: US 8,364,659 B2
(45) Date of Patent: *Jan. 29, 2013

(54) NETWORK SERVER EMPLOYING CLIENT FAVORITES INFORMATION AND PROFILING

(75) Inventor: James D. Bennett, Hroznetin (CZ)

(73) Assignee: Enpulz, L.L.C., Chicago, IL (US)

( * ) Notice: Subject to any disclaimer, the term of this patent is extended or adjusted under 35 U.S.C. 154(b) by 323 days.

This patent is subject to a terminal disclaimer.

(21) Appl. No.: 12/415,729

(22) Filed: Mar. 31, 2009

(65) Prior Publication Data

US 2009/0287683 A1  Nov. 19, 2009

Related U.S. Application Data

(60) Provisional application No. 61/053,098, filed on May 14, 2008.

(51) Int. Cl.
*G06F 17/30* (2006.01)
(52) U.S. Cl. ........ 707/706; 707/707; 707/709; 707/710; 707/722; 707/723
(58) Field of Classification Search .......... 707/706–710, 707/722–723, 736, 748–752
See application file for complete search history.

(56) References Cited

U.S. PATENT DOCUMENTS

| 7,181,438 | B1* | 2/2007 | Szabo | 1/1 |
| 7,603,437 | B2* | 10/2009 | Busey | 709/219 |
| 7,827,170 | B1* | 11/2010 | Horling et al. | 707/722 |
| 2005/0076003 | A1* | 4/2005 | DuBose et al. | 707/1 |
| 2007/0250514 | A1* | 10/2007 | Rajput et al. | 707/10 |

* cited by examiner

*Primary Examiner* — Fred I Ehichioya
*Assistant Examiner* — Tina Huynh
(74) *Attorney, Agent, or Firm* — Garlick & Markison; Bruce E. Garlick

(57) ABSTRACT

An Internet infrastructure that supports searching of web links wherein a user profile is used to reorder search results in a search result list for improved searching. The Internet infrastructure consists of a plurality client devices with web browsers that are incorporated with user-profiling modules and a search engine server. The process of searching and reordering includes the search engine server receiving a search string along with a user profile from the user-profiling module (or retrieving the user profile from a database). Then, the search engine server stores the user profile in a database that is associated with the search engine server and delivers search results based upon the search string, and reorders the search results based upon stored data in the database.

18 Claims, 8 Drawing Sheets

FIG. 3

Search Engine's Web Page (www.Search_Engine.com) 321

Name (Optional): 323
Age: 325
Occupation (Designation): 327
Sex (Male/Female): 329
Areas of Interest: 331
Email ID: 333
Password: 335

351
352
353
354
355
356
357

○ Allow Search Engine to Use this Information in Future Searching
337

Send User Profile
399

Client's Browser 395

305

NETWORK SERVER EMPLOYING CLIENT FAVORITES INFORMATION AND PROFILING

CROSS REFERENCES TO PRIORITY APPLICATIONS

The present application claims priority under 35 U.S.C. 119(e) to U.S. Provisional Application Ser. No 61/053,098, filed May 14, 2008, and having a common title with the present application, which is incorporated herein by reference in its entirety for all purposes.

BACKGROUND

1. Technical Field

The present invention relates generally to Internet infrastructures; and, more particularly, to search engines operating on the Internet.

2. Related Art

Search engines are widely used to navigate the Internet and to obtain search results or web links that provide wanted information. Such search information is often derived with only a few search words in a search string as input. The users may look for web pages through a variety of searches that reflect a variety of interests such as business, medical, social, engineering, and scientific research, as well as home-based or personal general interests. Search engines usually select search result web links based upon a search keyword (or, search string) and rank-order search results for presentation to a user based on the popularity of the web links.

The users may be interested, for example, in certain topic area such as business, medical, social, engineering, and scientific research, as well as home-based or personal general interests. Not all of the web links presented as search results are useful to the user, as many of the search results fall way out of user's target area of search or area of interest.

Often, web links that are genuinely helpful to the user are hidden somewhere in the end of search result list or embedded within a mass of thousands of search results, most not of interest to the user. Therefore, the few relevant search result or web pages in the long list of search results are practically unavailable to the user. These relevant search results may not percolate to the top of the search result list because they are not generally popular web links on the Internet (even though they may be exactly what the user is looking for) and the search engines typically pushes only popular web sites to the top of the search result lists for early presentation to the user. This logic assumes that when various users are using the same search words or search string that they are interested in the same few web links. Today's search engines typically ignore these errors and disconnects between the specific user and search results, and as a result, many (and sometimes all) of the search results or web links presented to the user for a search will waste significant amounts of the user's time, often resulting in frustration and/or abandonment of the search.

For example, a user may enter a search string typed in as 'car driving instructions'. The user may be seeking to find out what kind of precautions need to be taken to drive a specific kind of a car in certain conditions. The search results typically provide at the top search results and web links various pages and content from popular car manufacturers as well as other car sales/dealership companies. Thus, the user's interest in searching for safety and car operation instructions has failed or taken up too much user time because these relevant web links on safety and driving (if any are present at all) are often buried somewhere in the middle or at the end of a very long search result list (a list containing hundreds or thousands or more of search results). Therefore, a need exists for more efficient searching and provision of search results that correlated or relate better to user search interests.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 3 is an exemplary schematic diagram illustrating a snap shot of a search engine server's web page form interface wherein the search engine requests user information to assist the sever in higher quality searching;

DETAILED DESCRIPTION OF THE DRAWINGS

Figure 1:
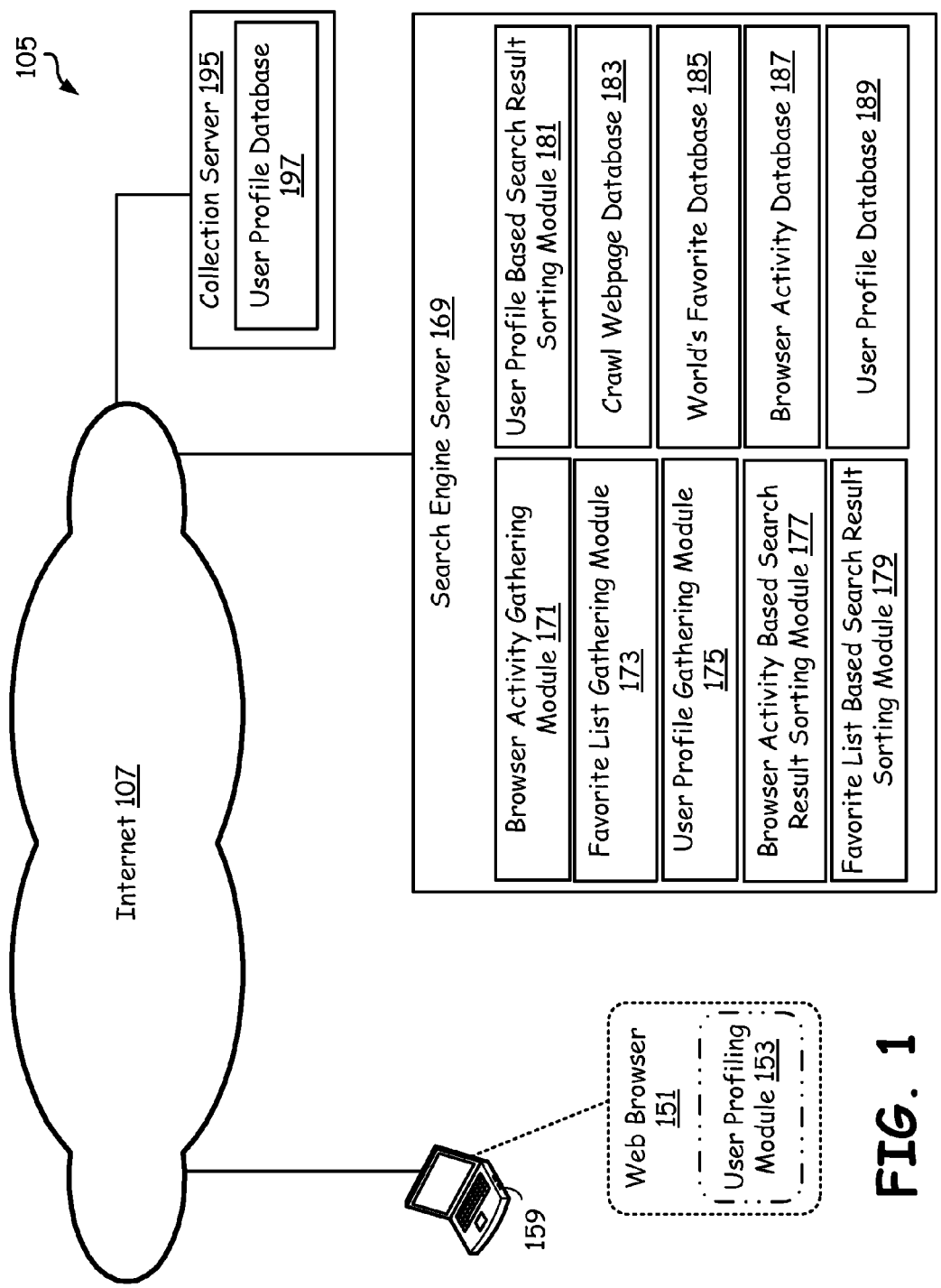
FIG. 1 is a schematic block/step diagram illustrating an Internet infrastructure containing a client device and web-browser-accessible search engine server wherein the server processing user profiles to present search results to a user.

FIG. 1 is a schematic block/step diagram illustrating an Internet infrastructure 105 that contains a client device 159 and a web-browser-accessible search engine server 169, wherein the search engine server 169 delivers search results based upon one or more search strings, and reorders the search results and/or selects the search results for placement in the search result list based upon a user profile. Specifically, a web browser 151 contained in the client device 159 is incorporated with a user-profiling module 153, which is a hardware and/or software module within the client device 159. The user-profiling module 153 utilizes one or more of methods to develop an up-to-date and latest user profile in the client device 159 (typically, used by a single user), and stores them along with collected data (e.g., browser usage data, client metadata, user favorites data, etc) in the client device 159.

The plurality of methods used to create and update the user profile include: (a) requesting that the user provide, via a web page form interface, certain relevant user information, such as age, occupation, sex/gender, areas of interest, etc. (for detailed discussion and illustration of the web page form interface, refer to the description of FIG. 3); (b) tracking user interaction with each web page, content access, click, or operation performed in the browser, storing these data results, and processing the stored data; and (c) retrieving one or more favorite list(s) and related metadata for the client or the specific user and processing the information to determine a user profile. The tracking of user interaction with the browser, other applications (like virus applications, adware applications, security programs, media applications, etc,), or web content may include gathering data such as time at which a web page or content is visited, duration for which a web page is visited, the kind of content processed on the web page (MP3 file, video, advertisements, on-line purchases, PDF accesses, pictures, news links, etc.), the kind of user graphical user interface (GUI) interaction with the browser (e.g., what is clicked, dragged, deleted, skipped over, lingered upon, etc.) and a number of times a web page or sub-content within a web page is revisited. Similarly, the favorite list related metadata of the browser or client may also contain these or other details that are relevant for the user's search. This entire progression of processing the data to determine the latest user profile may occur exclusively or in part in the user-profiling module 153, while rest of the processing, if needed, usually occurs in the search engine server 169. Also, the profile processing can be done at fixed intervals (like midnight every night or only on weekends), upon trigger events (like beginning of a user search), on polling or prompting from a client or server, or on some other cadence and/or under other control. The profile updating and processing can happen in the background of the client machine or can involve running an application or user involvement. The search engine server 169 gathers the latest user profile from the user-profiling module 153 on the client 159. In one embodiment, provision of certain user profile information may require user permission or editing in order to provide and process. Also, the user profile can be provided with a search string or in an operation separated from search string and search operations. The server and/or client can reorder the search results based upon the latest user profile to move more meaningful search results to the top of the search result list.

This latest user profile is gathered periodically or during delivery of search web page interface (for detailed description refer to the description of FIG. 2), with user permission, as needed. The latest user profile may be used for many things such as: (a) providing re-ordering processing and information of search results (either automatically behind the scenes or after a user turns on this feature causing the reordering post facto); (b) improved selection of search results for placement in the search results list; and (c) offering, in a search result side frame (or to the right or left of search results) or at a user home page, some recently popular sites that have high correlation with the sites that the user actually favors.

The Internet infrastructure 105 illustrated in FIG. 1 contains the search engine server 169 and a collection server 195 communicatively coupled to the client device 159 via an Internet 107. In some embodiments, the servers 195 and 169 may be together in the same server or may include a plurality of additional servers other than that illustrated in FIG. 1. The search engine server 169 contains a browser activity-gathering module 171 that collects the browser activity information (including user interaction with the browser and related programs) and stores this data in the browser activity database 187. The search engine server 169 also contains s favorite list gathering module 173 that collects the favorite lists and related metadata from the browser, client, and/or user and stores this data in the world's favorite database 185. The user-profiling module 153 obtains the information required for the latest user profile from various sources such as requesting the user provide such information from window inputs or an existing data profile, tracking the user's usage of internet, and obtaining favorite list and temporarily stores them in the client device 159. The user-profiling module 159 also processes the above-mentioned information and stores the results (i.e., the latest user profile) in the client device or related peripheral or server as well. Then, upon clicking of an 'activate user profiling' button in the web browser 151, a user profile gathering module 175 periodically receives the stores the latest user profile and stores it in the user profile database 189 for further processing, if needed.

The search engine server 169 begins interaction with the web browser 151 by delivering a starting search interface web page (that contains options to upload a favorite list and related metadata, upload browser related activity, and upload latest user profile to the search engine server 169). Soon after the favorite list and related metadata, browser activity information, and/or user profile data is received (along with a search string in this same interface or another interface) a user profile based search result sorting module 181 selects web links from a crawl web page database 183 (an expansive Internet database that contains content from crawling large portions of Internet content) and orders the search results by user profile, popularity and/or search correlation (or other dimensions, such as content age, content type, size of files, geographic location, etc). A browser activity based search result sorting module 177 orders web links, selected from the browser activity database 187, on the basis of the search string and likely by popularity. Similarly, a favorite list based search result sorting module 179 selects web links from the world's favorite database 185, on the basis of search string and orders them on the basis of popularity or on some other criterion or criteria. In addition, the collection server 195, which is an independent database server, may also contain a user profile database 197 that is used by the search engine server based upon request.

The search interface web page that is delivered as a first page upon request from the web browser 151 allows a user to search on the basis of: (a) selecting web links from browser activity database 187 alone; (b) selecting web links from world's favorite database 185 alone; (c) selecting web links from crawl web page database 177 alone; (d) reordering search results based upon trends, using favorite behavior, browser activity behavior and/or user profile; (e) reordering search results based upon information in the user profile database 189; and/or (e) any of the combinations of (a) through (d). In addition, the 'send browser activity' button and the 'send favorite list' button allow users to send browser activity information and/or favorite lists and related metadata for processing, storage, and use by the server(s). An 'activate user-profiling' button switches on user-profiling module 153 activity in the client device(s) any time, and allows the user-profiling module 153 to gather user information by providing a web page form interface. The user is also provided with a helpful tip that lets the user know the terms with which the user profile is generated by the search server engine 169 and user-profiling module 153. For example, the helpful tip may be "Note: This Search Engine also searches within World's Favorite Lists and using Browser Activity, if chosen. Trend button allows recently added and high visit volume preferences to come to the top of the Search List. Including User Profile betters the search for you."

Figure 4:
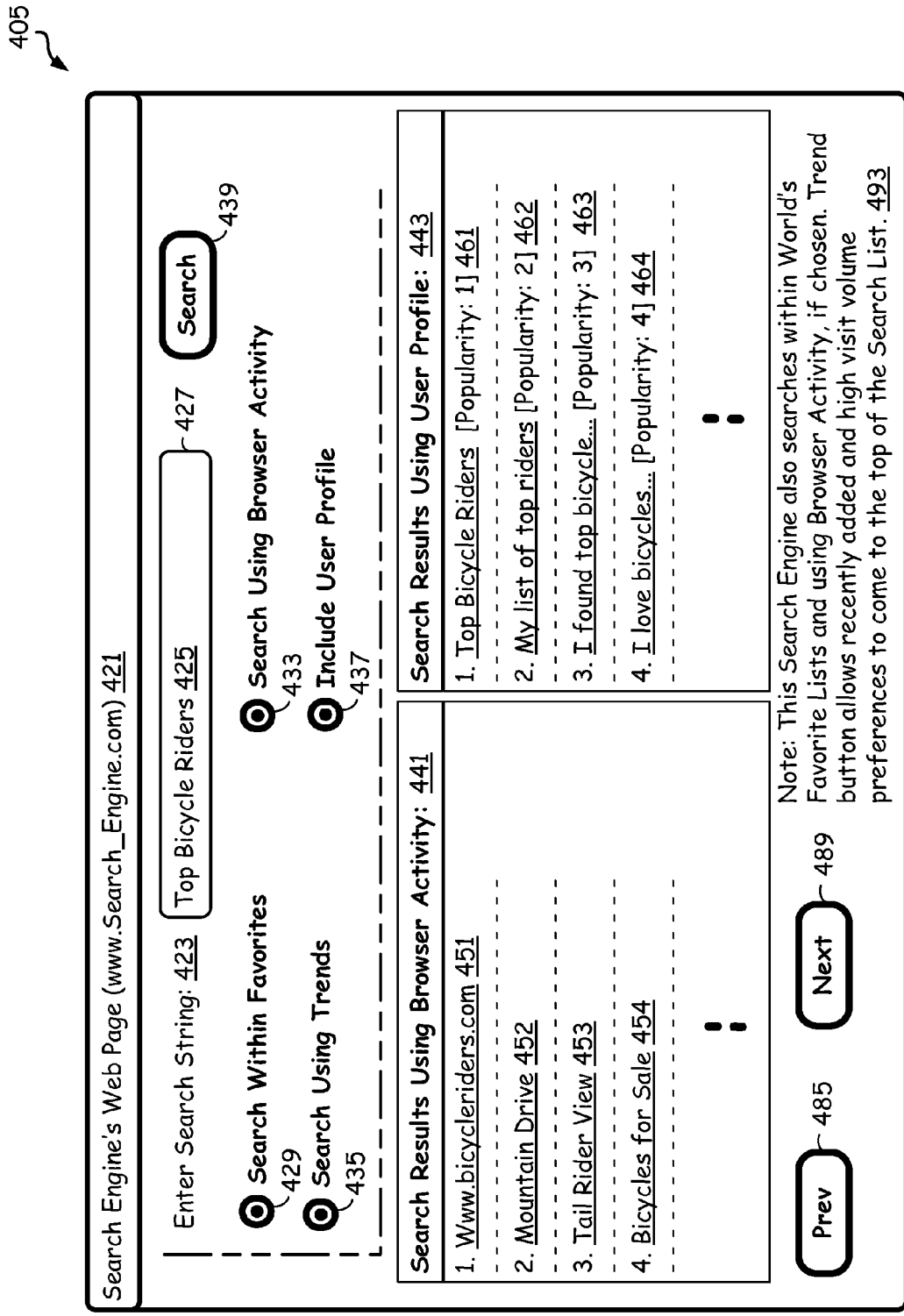
FIG. 4 is an exemplary schematic diagram illustrating a snap shot of a first search result page assembled by a client and/or a server based upon a search string, favorite lists and related metadata, trends, browser activity information and user profile.

A search result page (for a detailed description of the search result page, refer to the description of FIG. 4) may contain, in independent columns or as mixed results, web links or search results selected on the basis of: (a) correlating words, phrases, text, or data of search string with that of web page contents only from the crawl web page database 183; (b) correlating words, phrases, text, or data of search string with that of web page contents from the world's favorite database 185; (c) correlating words, phrases, text, or data of search string with that of web page contents from browser activity database 187; (d) ordering using the latest user profile received from the user-profiling module; (e) using trends based on favorite behavior, browser activity behavior and user profiles information to select or order search results; and/or (f) correlating words, phrases, text, or data of search string with that of web page contents only from an advertisement database. All of the web links thus selected from (a) through (f) and sorted by one or more priority characteristics may be delivered separately in each search result page or may be mixed to form fewer search result lists that are delivered in fewer columns or bundles to the user. In addition, the user may be provided with some flexibility in deciding which of the combinations of (a) through (f) is delivered in a search result page.

For example, every web browser such as browser 151 has an Internet browsing profile that is typically not collected or used for anything. If the user is always searching for or visiting Disneyland, Toys R Us, stock market info, a bond market account site, a Chicago jazz band site, fishing gear sites, etc., (i.e., favorites behavior or browser activity behavior) and perhaps even added them to the user's "my favorites" list, the user-profiling module 153 analyzes and/or correlates the favorites behavior and favorites list (by correlating site content with particular attention to unusual or distinguishing words and word frequency). Through such analysis and correlation and possibly other user/client/browser data processing, the user-profiling module 153 produces a user profile. In addition, the user information obtained via the web page form interface is also used to refine the user profile.

For example, the user may be an engineer, 35 years old and is interested in nanotechnology design related web sites that provide information regarding his or her professional work. In this case, whenever the user enters search string that contain words related to nanotechnology design, the search engine server 169 in one of the columns provides web links that of interest to the user exclusively based on the user profile. The data stored by the user-profiling module 153 may contain, for example, information that indicates that the user mostly uses the Internet for browsing between 6 pm to 8 pm, and visits nanotechnology related web links 73% of the time and science news related web sites 12% of the time from Monday through Saturday. The user-profiling module 153, in this case, is able to construct a user profile that includes all of the user information and browsing behavior, such as: (a) User's Area of Interests: Science, Nanotechnology, News and Personal; (b) Visiting Hours for nanotechnology: 6 pm to 8 pm, Most Viewed Web Site: 'ABZ.com', Percentage of Time Dedicated to 'ABZ.com': 26% etc. From this user profile, the search engine server 169 determines that if the search string received during a search is related to the area of nanotechnology or some tangential area determined by accessing correlation data to other sites on the server, the user is likely to be interested in many of the nanotechnology related web links and the server may deliver such web links either separately or mixed with other search result lists derived from other database sources on the server(s), as mentioned above.

Figure 2:
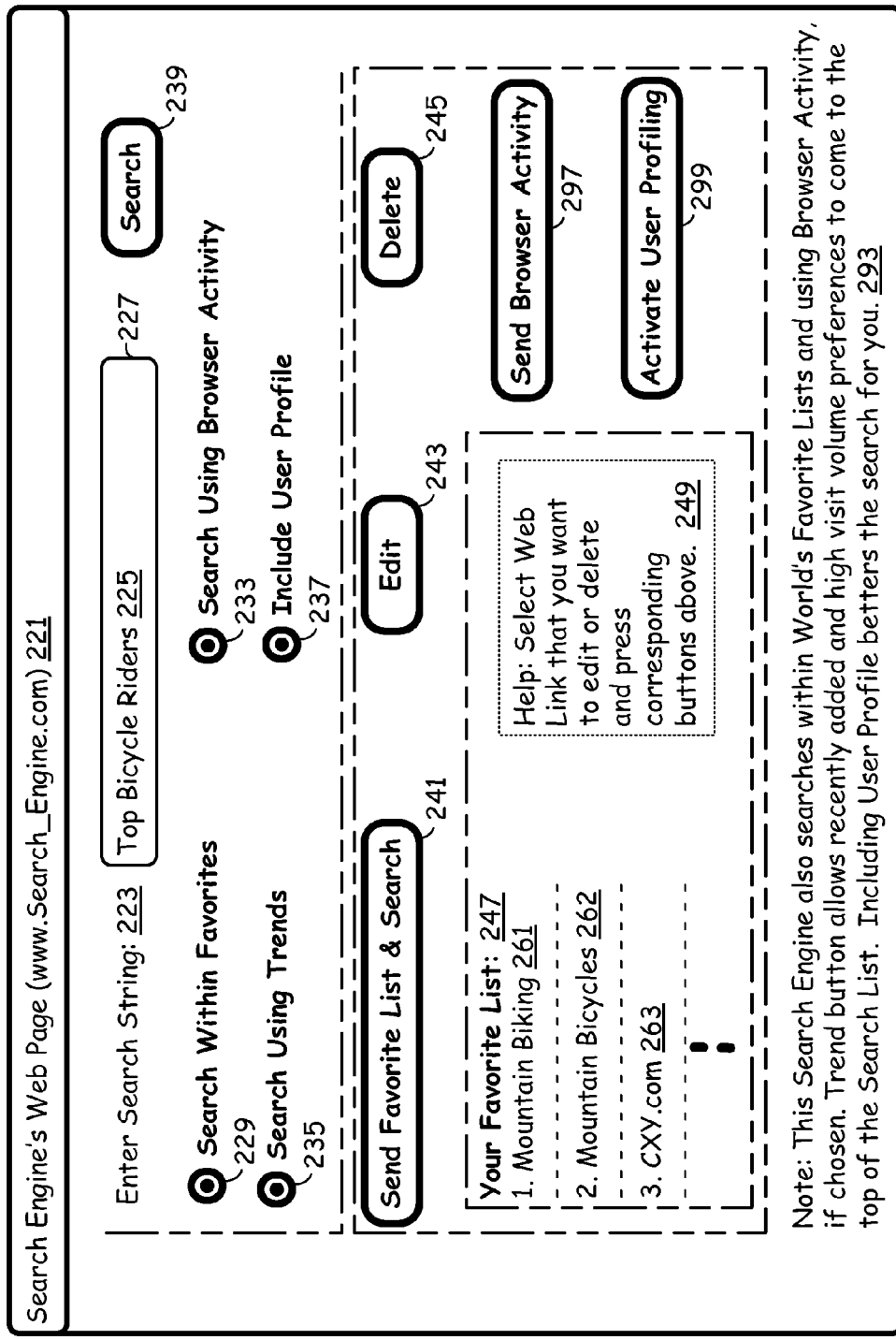
FIG. 2 is an exemplary schematic diagram illustrating a snap shot of a search interface web page of the search engine server of FIG. 1, wherein the search interface web page allows a user to send various information and make various selection to improve search result quality.

FIG. 2 is an exemplary schematic diagram illustrating a snap shot of search interface web page 205 of the search engine server of FIG. 1, wherein the search interface web page 205 allows a user to send browser activity information to the server or allow the server to have access to the info and provides user options to allow for searching within favorites, searching using trends, searching using browser activity information, and searching or search result ordering using or including a user profile. The page of FIG. 2 may be assembled by the server and/or by the client with information from the server and provided via a graphical display screen to the user. Specifically, the exemplary snap shot illustrated in FIG. 2 shows the search engine server's search interface web page 205 delivered to the client device's web browser 295 to facilitate user searching, to allow for the sending browser activity information, and favorite list and related metadata, and to activate user profiling (that is, to begin to collect user information, browser activity information and favorite list, process the information, etc., and send (or allow access to) the resulting latest user profile via the search engine server periodically or during searching). The search engine server's search interface web page 205 may contain a page title such as 'Search Engine's web page (www.Search_Engine.com)' 221, and a 'search' button 239. Along with 'search' button 239, the search interface web page 205 also contains a 'search within favorites' radio button 229, a 'search using browser activity' radio button 233, a 'search using trends' radio button 235, and an 'include user profile' radio button 237 (or some other GUI or user interaction form of user selection other than a radio button) that help refine the search, in accordance with the teachings herein. The user is able to restrict a search only within a browser activity database, a world's favorite database, a search using trends based upon favorite behavior, a browser activity behavior and/or a search that processes or includes user profiling (and reordering of the list via user profile(s)), by using these radio buttons 229, 233, 235, and 237. In addition a text message such as 'Enter Search String:' 223 and text entry box 227 are provided to facilitate user search input and data provision. The user may enter a search string or search data in the text box 227, such as 'Top Bicycle Riders' 225, make appropriate choices on the interface of FIG. 2, and click on the 'search' button 239 to initiate a new search or refine an existing search.

An additional favorite list windowpane in FIG. 2 is provided for the user to edit and/or send browser activity information, favorite list, and related metadata and activate user profiling. The windowpane loads up favorite list from the web browser automatically, as illustrated. For example, the windowpane may contain a title such as "Your Favorite List" 247, followed by a list of web links such as links 261 through 263 in FIG. 2. The windowpane also has one or more buttons to edit and delete the favorite list contents, via 'Edit' button 243 and 'Delete' button 245. By using these buttons 243 and 245, the user can add additional web links to the list, delete certain web links from the list, or edit some of the links. Also, a 'Send Favorite List and Search' button 241 allows the user to send one or more favorite lists to the server (or provide the server with access to these lists) and initiate a new search (based on the search string in the text box 227) at the same time. A 'Send Browser Activity' button 297 allows the user to send browser activity information to the server (or provide the server with access to such information). Another button 'Activate User-profiling' 299 pops up a window of a web page form interface that requests the user to provide some of the user information. If on the other hand, the user information is already provided, the pressing of 'Activate User-profiling' 299 button may switch on a user-profiling feature. In another embodiment, the windowpane may allow simultaneous sending of browser activity information, favorite list and metadata, and search information.

A helping text tip within the windowpane such as "Help: Select Web Link that you want to edit or delete and press corresponding buttons above" 249 helps a user to understand how to edit and send favorite list and related metadata as part of a searching operation. In addition, a helpful note 293 may be provided to help a user to understand that the data is collected anonymously to facilitate a better search or is subject to a certain privacy policy/standard. The helpful note may be a note such as this note in FIG. 2:

"Note: This Search Engine also searches within World's Favorite Lists and using Browser Activity, if chosen. Trend button allows recently added and high visit volume preferences to come to the top of the Search List. Including User Profile betters the search for you"

FIG. 3 is an exemplary schematic diagram illustrating a snap shot of a search engine server's web page form interface 305 wherein the search engine requests that the user provide certain user information. The web page form interface is a pop up window or another web page that interacts with a user in some form, e.g., via the client's browser 395, and collects user information through the interaction. The user information may include name (optional), age, occupation, sex/gender, ethnicity, family tree, medical data, hobbies, areas of interest, etc. In addition, the page may also have an email ID (Identity tag) and password facility so that user can login and change the information anytime by clicking on 'activate user profiling' button (the button 299 of FIG. 2). Another radio button or other user input mechanism provides a user with a facility to allow the search engine server to utilize this information (refer to the description of FIG. 2). In other embodiments, the web page form interface configuration 305 may appear different or be arranged differently from that shown in FIG. 3, it may even contain different interfaces and access existing information pertaining to the user that already exists on the client device. The client may contain an application, a part of the browser, or extra software that monitors user use patterns of the client over time to augment, update, or change the user profile information as time goes on.

The search engine server's search interface web page form interface 305 may contain a page title such as 'Search Engine's web page (www.Search_Engine.com)' 321. The web page form interface 305 may also contain text boxes for name (optional, to maintain the privacy of the user) 351, age 352, occupation (designation) 353, sex/gender (male/female) 354, areas of interest 355, among other text boxes. In addition, the text boxes are preceded by titles such as 'Name (Optional)' 323, 'Age' 325, 'Occupation (Designation)' 327, 'Sex/Gender (Male/Female)' 329, 'Areas of Interest' 331 etc. Text boxes 356 and 357 and corresponding titles 'Email ID' 333 and 'Password' 335 allow a user to enter email ID and password to secure the user information from access by other users or sources.

A radio button 337 along with a title 'Allow Search Engine to Use this Information in future searching' allows the user to decide whether to allow the search engine server and user-profiling module to access the user information when needed. These security or use selections/features can also be provided in a control panel or other application of the client or server. The information entered by the user or derived from the client as discussed above could be used to develop a user profile via the user-profiling modules taught herein. In addition, a 'Send User Profile' button 399 allows the user-profiling module to store (permanently or temporarily) the user information in the client device and to utilize this information to develop a user profile that is used for search operations. In addition, at a later stage, the user-profiling module may send this user information to the collection server or search engine server as searches are requested and performed.

FIG. 4 is an exemplary schematic diagram illustrating a snap shot of a first search result page 405 derived by the server and presented by the client based upon a search string, favorite lists and related metadata, trends, browser activity information, and the user profile taught above. The exemplary snap shot illustrated in FIG. 4 shows the first search result page 405 as delivered to web browser 495 of the client device to facilitate the user's browsing, processing, a and access to search results and web page search items. The first search result page 405 illustrated in FIG. 4 contains a page title such as 'Search Engine's web page (www.Search_Engine.com)' 421, and a 'search' button 439. In addition, the search interface web page 405 also contains a 'search within favorites' radio button 429, a 'search using browser activity' radio button 433, a 'search using trends' 435 radio button, and 'include user profile' radio button 437 that help refine a new search, if initiated by the user. The user is able to restrict a search only within one or more of the browser activity database, world's favorite database, search using trends based upon favorite behavior, browser activity behavior and/or search operations including/processing the user profile (and/or reordering the search result list based thereon), by using these radio buttons 429, 433, 435 and 437, which may be delivered in multiple columns or in fewer columns or segmented areas as mixed results from all the sources. A text note such as 'Enter Search String:' 423 and a text box 427 are provided to facilitate user's search input and data entry. The user may enter the search string in the text box 427, such as 'Top Bicycle Riders' 425, make appropriate choices in FIG. 4, and click on the 'search' button 439 to initiate a new search.

The first search result page 405 also contains the 'prev' button 485 and 'next' button 489 to allows the user to access any prior-displayed search result pages and any subsequent search result pages, respectively. A helpful note to the user, such as note 493 may be provided as follows:

"Note: This Search Engine also searches within World's Favorite Lists and using Browser Activity, if chosen. Trend button allows recently added and high visit volume preferences to come to the top of the Search List"

Also, the first search result page 405 may contain, in various columns and/or window panes on the client display, web links selected by using: (a) user profile; (b) browser activity database; (c) world's favorite database; (d) crawl web page database; and (e) an advertisement database. The columns also contain web links selected on the basis of trends or based on one or more user profiles, browser activity behavior, and favorite behavior. All of the web links thus selected using the above mentioned data sources and criteria may be delivered separately each in a separate search result page or may be mixed together to form fewer lists that are delivered in fewer columns, pages, or segmented areas. The first search result page 405 illustrated in the exemplary snap shot shows two columns, namely, 'Search Results Using Browser Activity' 441 and 'Search Results Using User Profile' 443, each containing web links selected on the basis of search string 'Top Bicycle Riders' 425 from selected sources from the following database sources from FIG. 1: the crawl web page database, browser activity database and world's favorite database. Here the sources illustrated are the browser activity database and the user profile filtered algorithm that may use one, several of all of the databases shown in the system of FIG. 1. The two columns illustrated show web links 1 through 4, as links 451 through 454 and links 461 through 464, under the columns 'Search Results Using Browser Activity' 441 and 'Search Results Using User Profile' 443, respectively.

Figure 5:
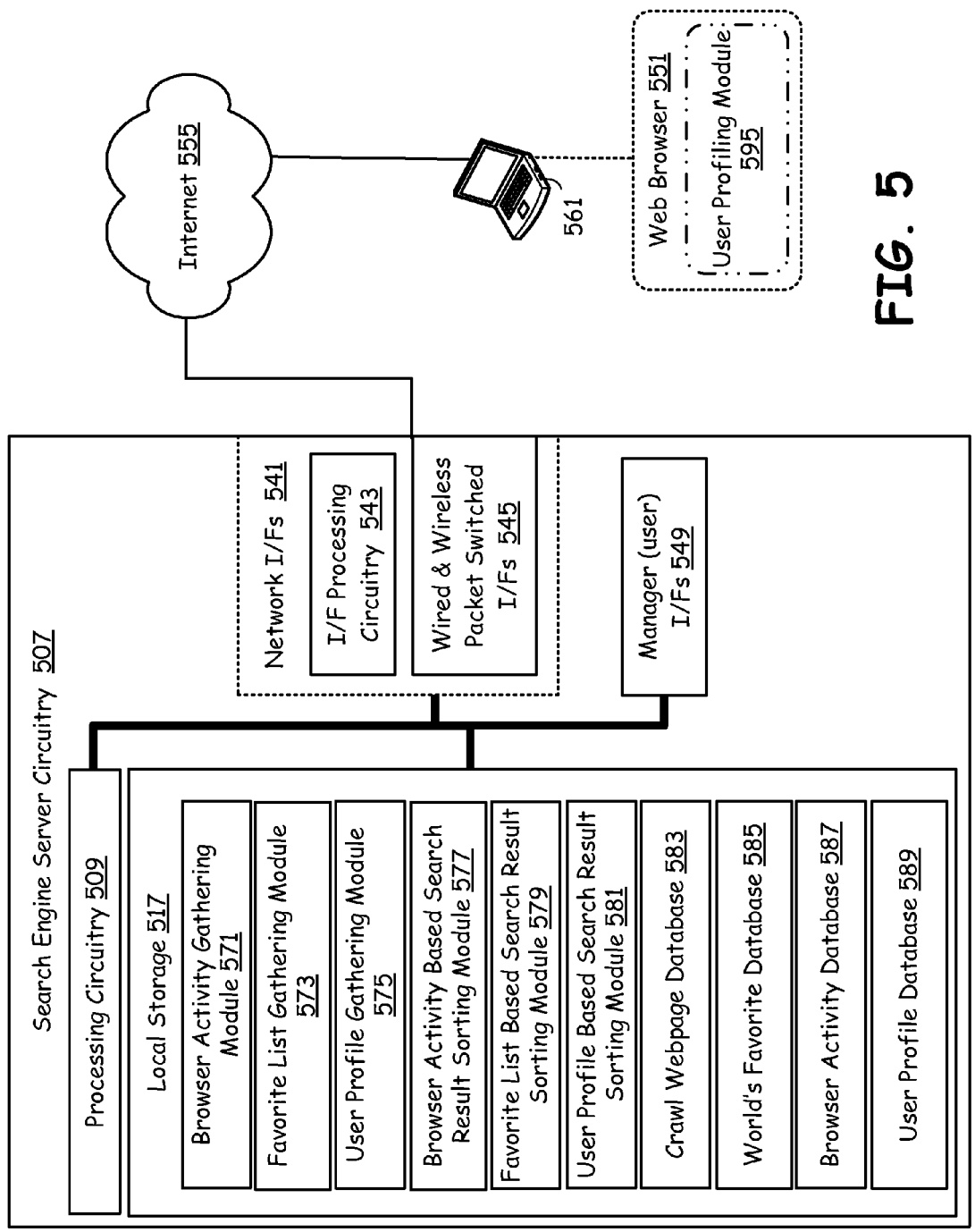
FIG. 5 is a schematic block/step diagram illustrating components of the search engine server constructed in accordance with the embodiment of FIG. 1.

FIG. 5 is a schematic block/step diagram illustrating components of the search engine server 507 constructed in accordance with the embodiment of FIG. 1. The search engine server circuitry 507 may, in part or full, be incorporated into any computing device that is capable of serving as an Internet based server or a like system. The search engine server circuitry 507 generally includes processing circuitry 509, local storage 517, manager interfaces 549, and network interfaces 541. These components are communicatively coupled to one another via one or more of a system bus, dedicated communication pathways, or other direct or indirect communication pathways. The processing circuitry 509 may be, in various embodiments, a microprocessor, a central processing unit (CPU), a graphics processor unit (GPU), a digital signal processor, a state machine, an application specific integrated circuit (ASIC), a field programming gate array (FPGA), combinations of any number the forgoing in any manner, multi-core processors, or other processing circuitry.

Local storage 517 may be any type of random access memory (RAM), read-only memory (ROM), flash memory, nonvolatile memory, ferroelectric storage, EEPROM and EEPROM, a disk drive, an optical drive, magnetic memory, cache memory, one time programmable (OTP) memory, combinations thereof, or another type of memory that is operable to store computer instructions and/or data. The local storage 517 includes a browser activity gathering module 571, a favorite list gathering module 573, a user profile gathering module 575, a browser activity based search result sorting module 577, a favorite list based search result sorting module 579, a user profile based search result sorting module 581, a crawl web page database 583, a world's favorite database 585, a browser activity database 587 and a user profile database 589 to facilitate user Internet-based searching (or other searching over any wired, wireless or other network) in one of several modes advantageous to the user. The client device 561 illustrated in FIG. 5 is communicatively coupled to the search engine server 507 via the Internet 555 (or another network) and contains a web browser 551 and a user-profiling module 595 to collect and process user profile data as taught herein.

The browser activity-gathering module 571 gathers browser activity information, processes it, and stores this data in the browser activity database 587. Browser activity information similar to the following information for a user or a client device: a time at which a web page is visited, duration for which a web page is visited, the kind of interaction performed with a web site, the content accessed in the web site (ads, movies, text, PDF, audio, etc), the amount of clicks or level of interaction with the web site, the number of sub-URLs visited within a parent web site, and/or number of times a web page is revisited. The favorite list-gathering module 573 gathers favorite lists and related metadata from the web browser 551 and stores this data in the world's favorite database 585 or uses this information to derive the database 585 by crawling correlating sources over the Internet. The gathering of a favorite list and related metadata occurs during search engine server's 507 interaction with the web browser 551 of the client device 561, or on a periodic interrupt cycle, in background processing on off-hours, initiated by one or more trigger events over time, or another process or combination thereof.

The user-profiling module 595 that is incorporated into the web browser 551 tracks the user's usage of Internet and various applications of interest to search operations, gathers user information and favorites list, and processes this information and temporarily or permanently stores it in the client device 561 for use when performing search operations. Upon clicking of an 'Activate User Profile' button in the web browser 551 or some other transfer or access mechanism between the client and server, the user profile gathering module 575 at the server 507 receives the stored latest user profile from the client 561, processes it, and stores it in the user profile database 589 on the server side of the system (or some server-accessible memory location).

The browser activity based search result sorting module 577 orders web links that have been selected from the browser activity database 587, on the basis of the search string and by popularity or some other set of criteria. The favorite list based search result sorting module 579 orders web links that have been selected on the basis of search string, by popularity or some other set of criteria. The user profile based search result sorting module 581 applies the user profile criteria, generated from the data stored in the user profile database 589, on the web links selected from the crawl web page database 583 to eliminate, edit, or select various search results or reorder the existing selected search results in the selected web link list.

The network interfaces 541 contain wired, optical, and/or wireless packet-switched or other interfaces 545 and may also contain built-in or an independent interface processing circuitry 543 (like a dedicated CPU or plurality of CPUs for communication protocols). The network interfaces 541 allow the search engine server 507 to communicate with client devices such as device 561 in FIG. 5 and to deliver search result pages of web links between servers and clients. The manager interfaces 549 may include display and keypad interface(s). These manager interfaces 549 allow a user or IT expert at the search engine server 507 to control various aspects of the system.

In other embodiments, the search engine server 507 of FIG. 5 may include fewer or more components than are illustrated as well as lesser or further functionality. In other words, the illustrated search engine server is meant to merely offer one example of possible functionality, block/step segmentation, and construction in accordance with the teachings herein.

Figure 6:
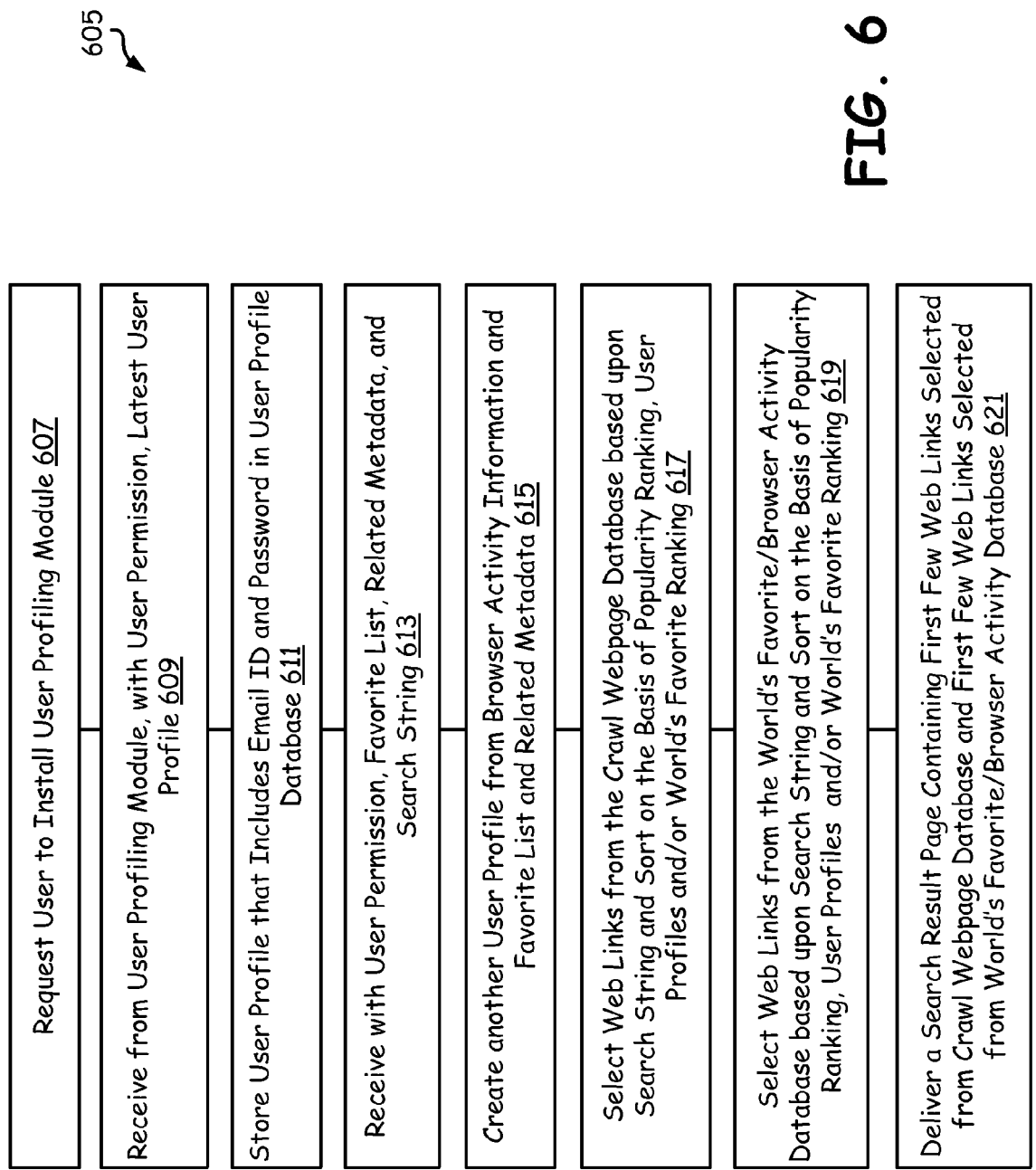
FIG. 6 is a flow diagram illustrating a functionality of the search engine server of FIG. 1.

FIG. 6 is a flow diagram illustrating the functionality of the search engine server of FIG. 1. The functionality 605 of the search engine server begins at a block/step 607, where the search engine server requests that the user of the client device install and/or execute the user-profiling module. At a next block/step 609, the search engine server receives from the user-profiling module the latest user profile, with user permissions (as applicable). The search engine server may obtain the latest user profile periodically or along with a search string during initiation of a new search. In the case of initiation of a new search, the search engine may also search through the user profile database to retrieve a latest user profile, provided the user has permitted the search engine server to access and use the profile. At a next block/step 611, the search engine server stores the user profile that includes access-protection via an email/user ID and password in the user profile database. The email/user ID and password help user to protect and/or update the user information over time.

At a next block/step 613, the search engine server receives, with user permission (if applicable), a favorites list and related metadata, along with a search string, where the favorite list info and possible some metadata are again is stored in the world's favorite database. At a next block/step 615, the search engine server creates another user profile from browser activity information that is received from the web browser, and this process may also using favorite lists and related metadata. This user profile helps the search engine to create browser or Internet usage trends based upon browser activity information and favorite list and related metadata.

At a next block/step 617, the search engine server selects web links from the crawl web page database based upon the search string, and the server sorts the web links on the basis of popularity ranking, correlation to the user profile, and/or the world's favorite ranking. Here, the user profile may be used to reorder the selected web links such that the web links that are likely to be of interest to the user are placed higher up in the ranking and therefore displayed very early on the user in the search result display and processing. The likelihood of a web link being of interest is determined based on the user/search information provided to the search engine by the client over time and the user's browsing behavior, trends, profile, etc.

At a next block/step 619, the search engine server selects web links from the world's favorite database and/or browser activity database based upon the search string and sorts on the basis of popularity ranking, user profile and/or world's favorite database. At a next block/step 621, the search engine server delivers a search result page containing first few web links selected from the crawl web page database and first few web links selected from world's favorite database and browser activity database.

Figure 7:
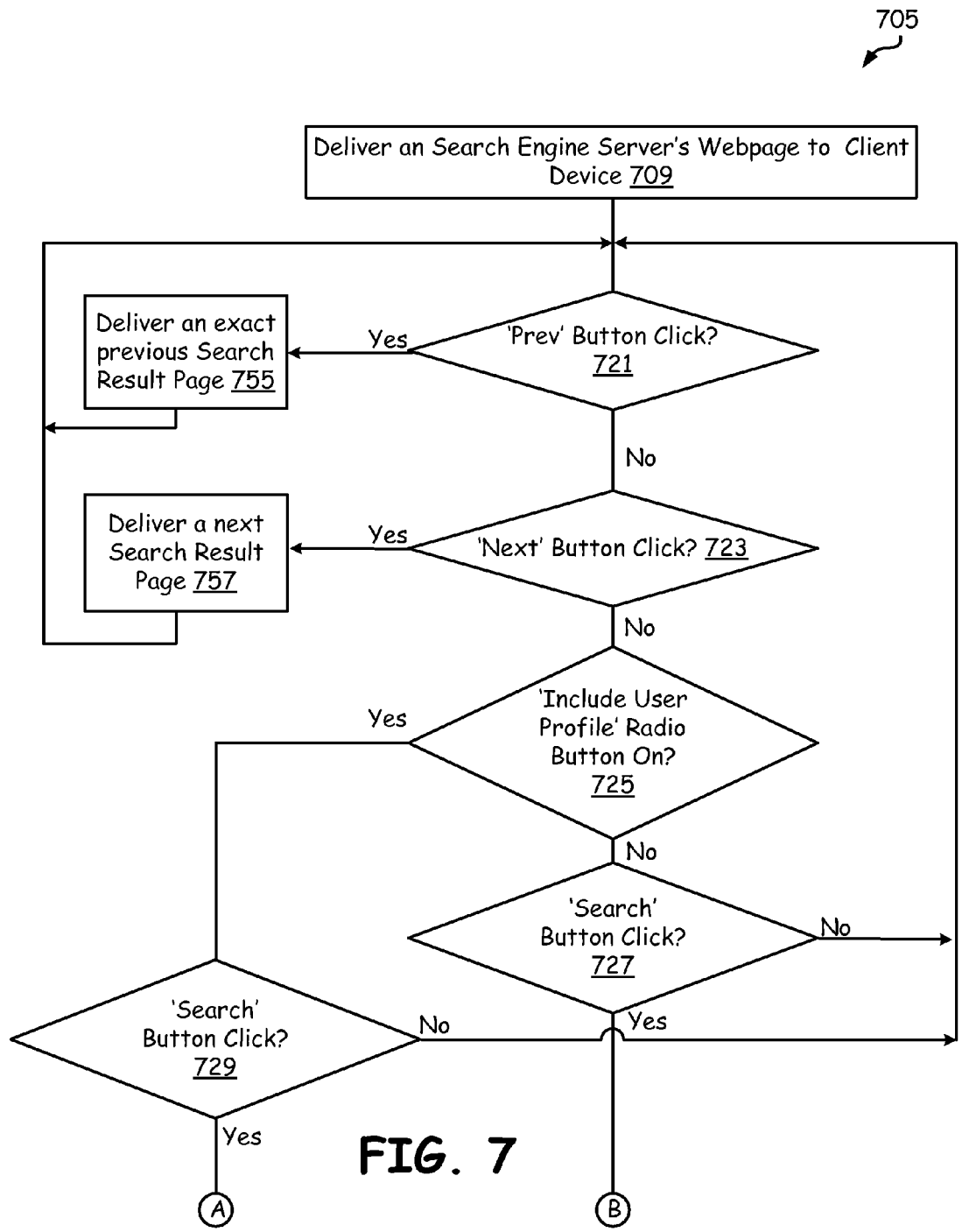
FIGS. 7-8 illustrate a flow diagram showing the functionality of the search engine server of FIG. 1 upon delivery of a search engine server's web page, in one embodiment.

FIG. 7 is a flow diagram illustrating the functionality of the search engine server of FIG. 1 upon delivering a search engine server's web page in one embodiment. The functionality 705 of the search engine server begins at a block/step 709, where a search interface web page (refer to FIG. 2 for detailed description of a typical search interface web page) or subsequent search engine server's web page is delivered from the server to the client. The search interface web page allows a user to initiate a new search using a new search string and typically contains an interface to enter a search string and upload the favorite lists and related metadata and browser activity information, and have an interface that allows the user or the client to activate the user profile. Similarly, the subsequent search result pages (refer to the description of FIG. 4 for one example) contain interfaces to enter a new or refined search string, as well as the 'next' and 'prev' (or 'previous') buttons as previously discussed. The search interface webpage or subsequent search engine server's web page allows a user to search using: (a) browser activity information; (b) favorite lists and related metadata; (c) user profile created by the user-profiling module; and/or (d) trends based upon favorite behavior and browser activity behavior. The browser activity information related search may be performed by selecting a 'search using browser activity' radio button and user profile information may be included in the search process by selecting the 'include user profile' radio button. The functionality of radio buttons 'search within favorites' (button 229 of FIG. 2), 'search using browser activity' (button 233 of FIG. 2), and 'search using trends' (button 235 of FIG. 2) are not included in the current flow chart for ease of explanation as these features were discussed with respect to FIG. 2.

At a next decision block/step 721, the search engine server determines if 'prev' button is clicked. If yes, at a next block/step 755, the search engine server delivers an exact previous search result page and waits for new inputs from the user of the client device. In the case of the search interface web page, the 'prev' button is not available or not functional/active if present. If 'prev' button is not clicked at the decision block/step 721, then, at a next decision block/step 723, the search engine server determines if 'next' button is clicked. If yes, at a next block/step 757, the search engine server delivers a subsequent search result page contain more list(s) of search results. In case of the search interface web page, the 'next' button is not available or is not functional/active.

If the 'next' button is not clicked at the decision block/step 723, then, at a next decision block/step 725, the search engine server determines if the 'include user profile' radio button is on. If not, the search engine server determines, at a next decision block/step 727, if 'search' button is clicked. If yes at the decision block/step 727, then the search engine server begins processing of a new search criteria, based upon a search string at connector 'B' (refer to the FIG. 8 for continuation of the blocks/steps from connector 'B'). If 'include user profile' radio button is on at the decision block/step 725, then, at a next decision block/step 729, the search engine server determines if 'search' button is clicked. If yes at the decision block/step 729, then the search engine server begins processing of a new search criteria, based upon a search string and favorites at connector 'A' (refer to the FIG. 8 for continuation of the blocks/step via the connector 'A'). Note that the order of evaluation of the blocks/steps 721-729 may be changed in other embodiments and still perform a similar function to that taught herein.

Figure 8:
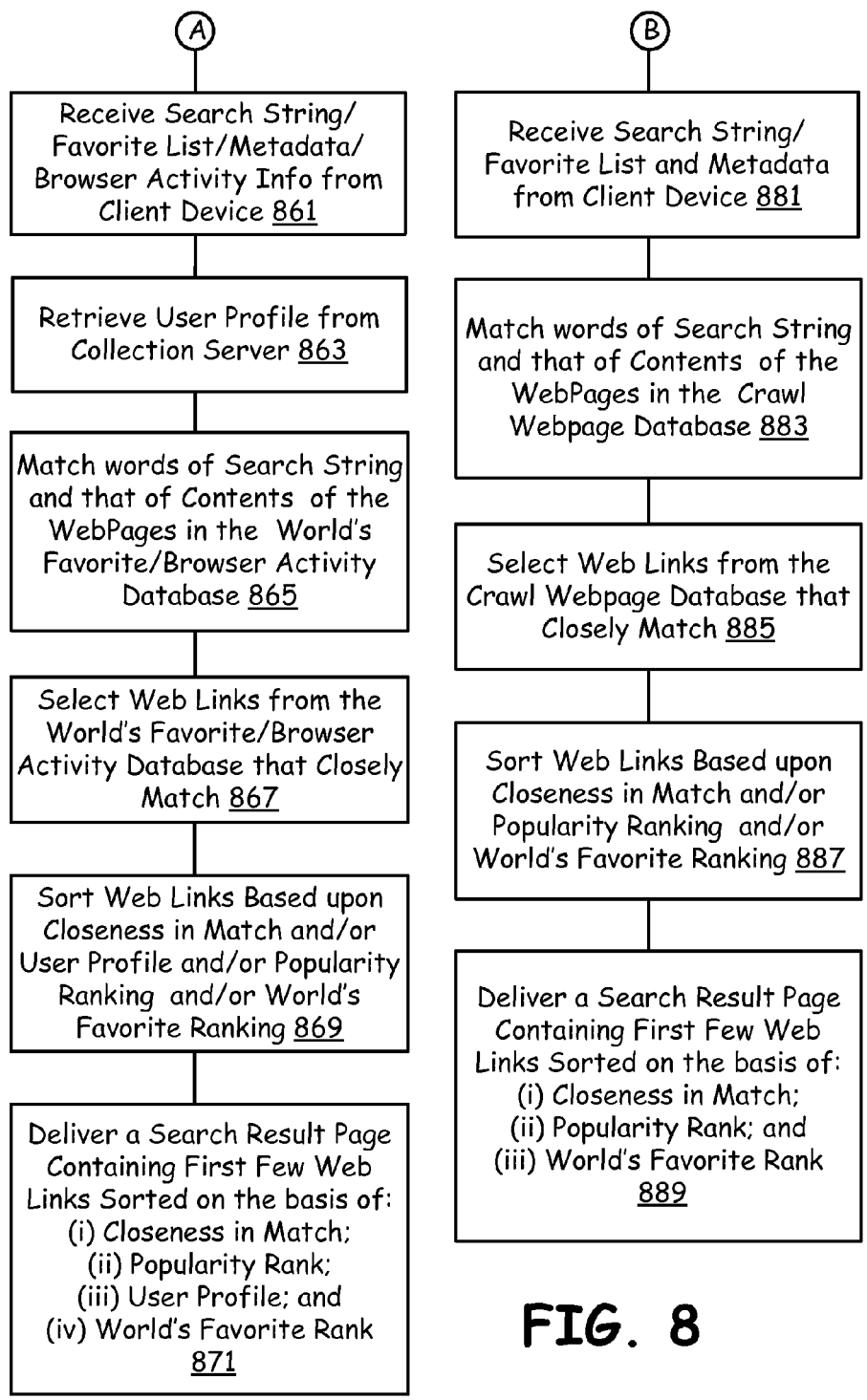

FIG. 8 is a flow diagram illustrating functionality of the search engine server of FIG. 1, as continued from FIG. 7 via connectors 'A' and 'B'. The continued functionality 805 of FIG. 7 at connector 'A' begins at a block/step 861 with the search engine server receiving a search string along with browsing activity information, favorite list, and metadata from client device's web browser. At a next block/step 863, the search engine server retrieves a user profile from the user profile database 197 on a collection server 195 of FIG. 1. Alternatively, the user profile may also be received from the user-profiling module, may be retrieved from the user profile database, or may be provided by another server over the Internet.

At a next block/step 865, the search engine server matches words of the search string with that of contents of the web pages in the world's favorite database and/or browser activity database. Then, at a next block/step 867, the search engine server selects web links from the world's favorite database and/or browser activity database, on the basis of closeness in match to the search string or information derived there from. At a next block/step 869, the search engine server sorts the selected web links based upon closeness in match to the search string or data derived there from and/or the user profile and/or popularity and/or the world's favorite ranking. At a next block/step 871, the search engine server delivers a search result page containing a first few web links sorted on the basis of: (a) closeness in match to the search string or data related thereto; and/or (b) popularity rank; and/or (c) user profile; and (d) world's favorite rank. These combinations may be displayed separately in multiple columns or in a single column. The browser activity ranking based web links may also be presented.

The continued functionality 805 from FIG. 7 at connector 'B' in FIG. 8 begins at a block/step 881 with the search engine server receiving a search string along with favorite list and metadata from client device's web browser. At a next block/step 883, the search engine server matches words, phrases, parsed data, or information of the search string with that of contents of the web pages in the crawl web page database. Then, at a next block/step 885, the search engine server selects web links from the crawl web page database, on the basis of closeness in match to the search string or information associated therewith or derived there from. At a next block/step 887, the search engine server sorts the selected web links based upon closeness in match and/or popularity ranking and/or world's favorite ranking. The browser activity information and user profile may also be used to sort the web links selected. At a next block/step 889, the search engine server delivers a search result page containing first few web links sorted on the basis of: (a) closeness in match; (b) popularity rank; and/or (c) the world's favorite rank. These combinations may be displayed separately in multiple columns or in a single column/area.

Note that the functionality of 'search within favorites', 'search using trends', 'search using browser activity' and also that of user sending the favorite list and metadata to the search engine server are not illustrated in FIGS. 7 and 8, as these features are described with reference to prior figures. However, these features may also be incorporated into the flow of FIGS. 7-8 to create different embodiments as taught herein. Therefore, for other embodiments, such functionality is shown in the snap shot of FIG. 2, as well as other variations (such as displaying mixed search results from various databases).

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips (e.g., a multi-core device). Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building block/steps and method steps (and their order in many some cases) have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building block/steps illustrating the performance of certain significant functions. The boundaries of these functional building block/steps have been arbitrarily defined for convenience of description. Alternate boundaries could be defined as long as any requisite or significant functions of a specific embodiment are appropriately performed in some manner by some structure/method. Similarly, flow diagram block/steps may also have been arbitrarily defined herein to illustrate certain significant functionality. To the extent used, the flow diagram block/step boundaries and sequence could have been defined otherwise and still perform the certain significant functionality. Such alternate definitions of both functional building block/steps and flow diagram block/steps and sequences are thus within the scope and spirit of the claimed invention.

One of average skill in the art will also recognize that the functional building block/steps, and other illustrative block/steps, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A computing device adapted to be coupled to a communication network, the computing device comprising:
    one or more processing units;
    memory coupled to the one or more processing units; and
    network communication circuitry coupled to the one or more processing units, wherein the one or more processing units, memory, and network communication circuitry are adapted to interoperate to perform the following operations:
        derive a user profile for a user, the user profile being created through: (i) receiving user profile input from the user; (ii) monitoring user interaction with a computer; and (iii) monitoring browser favorite information;
        receive a search string via the network communications circuitry, the search string containing search information;
        receive, in conjunction with the search string, a database selection indicating at least two of a user favorites database, a browser interaction database, and a user profile database to be searched;
        derive a search result list by searching data within the at least two of a user favorites database, a browser interaction database, and a user profile database, wherein search results in the search result list correlate appropriately with the search string;
        order the search result list to place more relevant search results higher in a rank order of the search result list based on processing of the user profile with the search results;
        deliver, via the network communication circuitry, search result information from the search result list for eventual use by the user; and
        retrieve one or more favorite list(s) and related metadata for the specific user and processes the favorite lists and related metadata to determine a user profile.

2. The computing device of claim 1, wherein the one or more processing units, memory, and network communication circuitry are adapted to interoperate to perform the following additional operations:
    process user interaction with the browser over time to derive the browser interaction database; and
    process at least one of the user interaction or the browser interaction database to ensure that only material user interaction data is present in the browser interaction database.

3. The computing device of claim 1, wherein the user profile contains information entered by the user and selected from the group consisting of: age, occupation, sex/gender, and areas of interest to the user.

4. The computing device of claim 1, wherein the user profile contains information derived from tracking user interaction with browser web pages, stores these data results, and processes the stored data, wherein the information is selected from the group consisting of: content accesses, click operations performed within in the browser, an operation performed in the browser.

5. The computing device of claim 1, wherein the search result list contains search results that are selected by processing the user profile.

6. The computing device of claim 1, wherein an ability to order the search result list to place more relevant search results higher in a rank order of the search result list based on processing of the user profile with the search results can be enabled or disabled by the user.

7. The computing device of claim 1, wherein the database selection indicates two sources selected from a group consisting of: a user favorites database, a browser interaction database, a user profile database, and a database assembled from crawling network content.

8. The computing device of claim 1, wherein the database selection indicates three sources selected from a group consisting of at least: a user favorites database, a browser interaction database, a user profile database, and a database assembled from crawling network content.

9. The computing device of claim 1 wherein the one or more processing units, memory, and network communication circuitry are adapted to interoperate to perform the following additional operation: store and process the user favorites data in addition to processing user interaction and the search string to prepare for search result searching.

10. The computing device of claim 9 wherein the user interaction that is monitored includes one or more of: (i) a time at which a web page is visited; (ii) a duration for which a web page is visited; (iii) recording a kind of interaction performed with a web site; (iv recording a kind of content accessed in the web site; (v) the amount of interaction that the user had with a web site; (vi) the number of additional subpages visited within a parent web page; and (vii) a number of times a web page is revisited.

11. The computing device of claim 10 wherein a step of processing the user interaction or the browser interaction database comprises filtering one or more of the following content from inclusion in the browser interaction database: (i) adult content; (ii) illegal content; (iii) content associated with malware activity; (iv) quickly closed web pages; (v) unwanted popups; or (vi) unwanted or advertisements.

12. The computing device of claim 1 wherein searching is performed using favorite data and the browser interaction database, and wherein a user input window is provided to the user to allow the user to inspect and edit favorite data before allowing the computing device to have access to the favorite data.

13. The computing device of claim 1 wherein the database selection indicates a plurality of data sources where each of the plurality of data sources are searched and a list of search results in the search result list is provided to the user including at least one search result from each selected source.

14. The computing device of claim 1 wherein database selection indicates a plurality of data sources where each of the plurality of data sources are searched and a list of search results in the search result list is provided to the user in segregated lists that are segregated based on source.

15. A search engine server that supports delivery of search result pages external to the search engine server, the search engine server comprising:
  a user profile gathering module that gathers a plurality of different user profiles associated with a user from external to the search engine server, with user permission, and stores the plurality of different user profiles in a database;
  a search module configured to perform a search within a user selected database;
  a user profile based search result sorting module that sorts search results provided by the search engine server using data in the database and wherein:
    the search engine server receives, from external to the search engine server, a search string, a user profile, and information selecting multiple profiles of the plurality of user profiles to use in performing the search;
    the user profile gathering module processes the user profile and stores the user profile in the database;
    the user profile based search result sorting module selects and sorts web links from a crawl webpage database, based upon the search string and multiple profiles as indicated by the information selecting multiple profiles, to form a user profile based search result list;
    the search engine server delivers the user profile based search result list external to the search engine server via a communication circuit; and
    wherein the user profiles are generated by retrieving one or more favorite list(s) and related metadata for the user and processing the favorite lists and related metadata to determine a user profile.

16. The search engine server of claim 15, wherein the search result page comprises an 'include user profile' button that a user can select or deselect to enable the use of the user profile by the search engine server.

17. The search engine server of claim 16, wherein the search engine server responds to the clicking of the 'include user profile' button by delivering a search result page containing web links ordered on the basis of the user profile.

18. The search engine server of claim 16, wherein the search engine server responds to the clicking of the 'include user profile' button by delivering search results containing web links that are selected and ordered on the basis of the user profile.

* * * * *

UNITED STATES PATENT AND TRADEMARK OFFICE
CERTIFICATE OF CORRECTION

PATENT NO. : 8,364,659 B2  
APPLICATION NO. : 12/415729  
DATED : January 29, 2013  
INVENTOR(S) : James D. Bennett Page 1 of 1

It is certified that error appears in the above-identified patent and that said Letters Patent is hereby corrected as shown below:

In the Claims

Col. 15, line 6, in claim 4: replace "within in the browser" with --within the browser--
Col. 15, line 47, in claim 11: replace "unwanted or advertisements" with --unwanted advertisements--

Signed and Sealed this
Third Day of December, 2013

Margaret A. Focarino
*Commissioner for Patents of the United States Patent and Trademark Office*